Aug. 4, 1953  A. E. ANDERSON  2,647,767
VALVED PIPE COUPLING FOR SUCTION LINES
Filed March 4, 1948
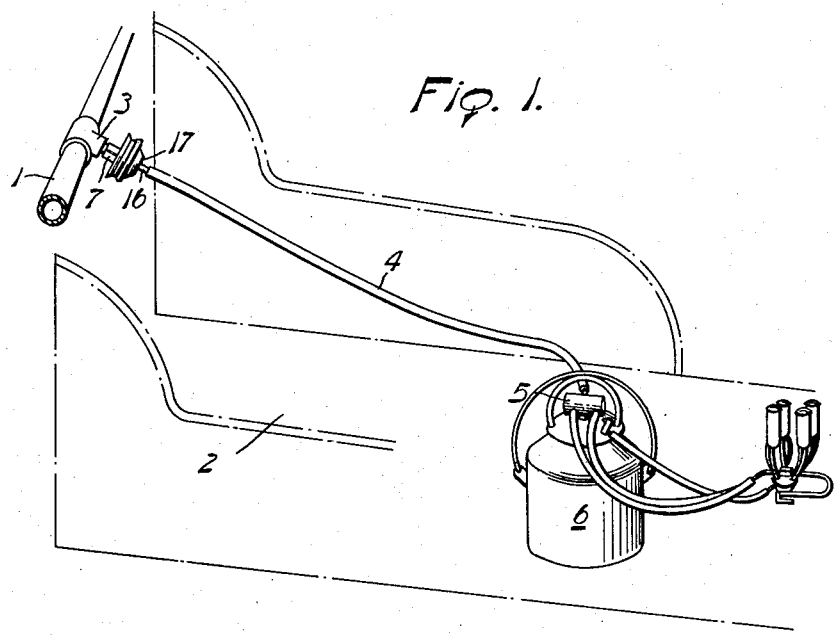
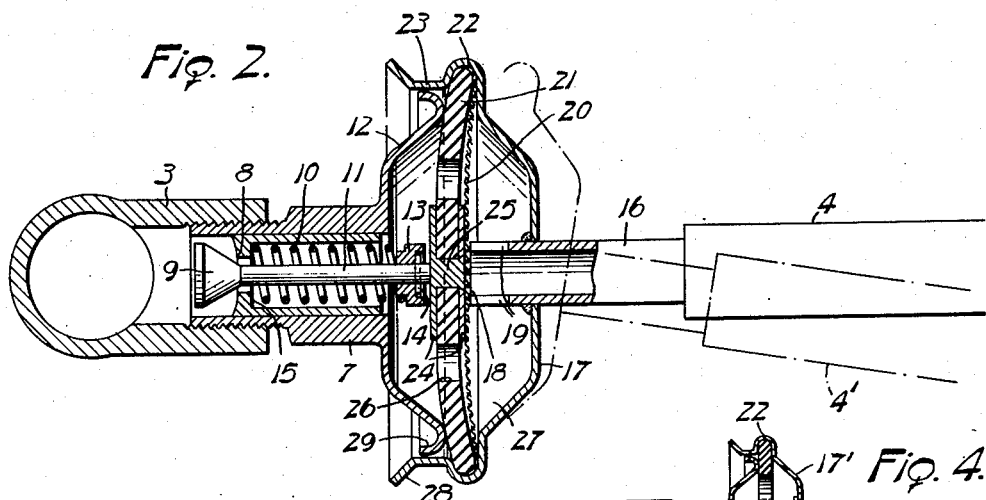
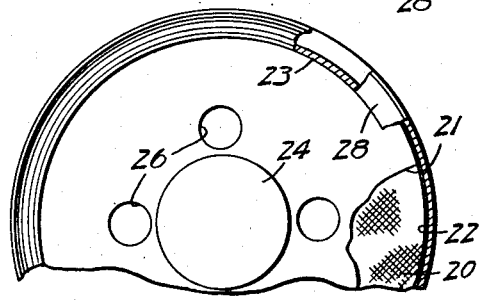
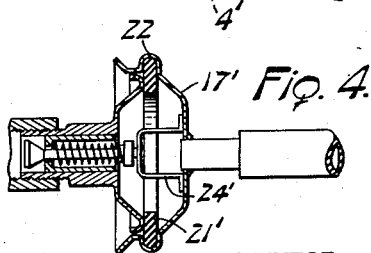
INVENTOR
Austin E. Anderson
BY
Beau, Brooks, Buckley + Beau.
ATTORNEYS Patented Aug. 4, 1953

2,647,767

UNITED STATES PATENT OFFICE 2,647,767

VALVED PIPE COUPLING FOR SUCTION LINES

Austin E. Anderson, Jamestown, N. Y.

Application March 4, 1948, Serial No. 12,955

9 Claims. (Cl. 284—19)

This invention relates to the dairy equipment art and primarily to an improved installation for effecting the milking operations through the instrumentality of suction actuated machines.

In the prior dairy installations it has been customary to connect the milking machine to the suction supply line by a length of hose and then by another operation to turn a valve for opening the suction influence to the machine. After the milking of a cow is completed a reverse sequence is resorted to, with likelihood of the hose becoming disconnected accidentally and the suction then intaking into the piping some of the litter and other clogging foreign matter as the hose falls into the bedding.

The primary object of the present invention is to provide an improved milking apparatus by which the milking operation may be facilitated as well as expedited in a practical and time saving manner.

Again, the invention will be found to reside in an installation in which foreign matter will be precluded from entering the pipe system and, further, one which will insure more effective sanitation throughout.

Furthermore, the invention has for its object to provide a simple and durable construction which is efficient in use and capable of giving satisfactory performance.

The foregoing and other objects will manifest themselves as this description progresses wherein reference is made to the accompanying drawing in which Fig. 1 is a general view showing the practical application of my invention;

Fig. 2 is a longitudinal sectional view through a part of the installation depicting more clearly the particular embodiment of the inventive concept;

Fig. 3 is a plan view, partly in section, of the milking machine connector; and

Fig. 4 is a sectional view of a slightly modified form of the invention.

Referring more particularly to the drawing, the numeral 1 designates the suction manifold or supply pipe which is located above the stalls 2 and runs crosswise at the head thereof. At suitable intervals, preferably at every second stall, lateral branches or fittings 3 are provided for selective connection by hose 4 to the pulsator mechanism 5 of a milking machine 6. Ordinarily, the branch 3 is equipped with a hand adjusted valve on which the hose is forced preliminary to opening the valve.

In accordance with the present invention, means are provided to close the lateral branch 3 automatically and to maintain it closed against the action of the internal negative pressure. For this purpose, a coupling member or nipple 7 is permanently attached to the lateral branch and is provided with an internal seat 8 and a valve 9 seating thereon under the urge of a coiled spring 10. The valve stem 11 extends outwardly through the valve seat 8 and into a bell or dished flange 12. A retaining ring 13, held in place by a cotter pin 14 or other suitable means, supports the spring at one end in opposition to an internal shoulder 15 on the outer side of the valve seat for the opposite spring end. The valve 9 is in the form of a tapered head and engages its seat close to the stem where its diameter is small. Consequently, the surface area on which the suction or pressure differential will act is small with the result that the spring 10 need exert only a little force to counteract the pressure differential and seat the valve normally against air leakage into the suction line 1.

The adjoining end of the hose is also equipped with a companion coupling member or nipple 16, likewise provided with a bell 17 into which extends the end of the nipple, as shown at 18. This end may be formed with transverse slots 19 for constant communication with the interior of the bell 17 regardless of whether or not the strainer or filter sheet 20 is in engagement with the open end 18. The filter sheet 20 is secured about its marginal portion by means of a heavy disk 21 which may be of circular shape and design for being sprung into an annular seat or groove 22 pressed into the side cylindrical wall 23 of the bell 17. This formation may be conveniently given through a spinning or other operation. The disk 21 is preferably formed from a rather thick sheet of rubber, or like resilient material, and at its center is reinforced by flanking metal disks 24 united by a stem 25. About this central reinforcement the rubber disk or body is provided with an annular series of openings 26 over which the filter sheet extends. The stiffness of the rubber from which the disk 21 is shaped is sufficient to support the same in a generally dished or concave shape, as shown in Fig. 2. This disposes the disk 24 on the convex side thereof and in a suspended position to engage the valve stem 11 for unseating the valve when the complemental bells 12 and 17 are fitted together. The flow of air will then be from the pulsator 5 through the hose 4 into the bell 17 through the filter sheet 20 and apertures 26 into the bell 12 and out through the port of the valve seat 8 into the suction line 1, the valve being supported in its open position by the resilient disk 21 against the pressure of spring 10. Any foreign matter picked up by the air stream passing through the hose 4 will be lodged in the chamber 27 of bell 17 as it is filtered out by the sheet 20. Likewise, any milk which may be drawn into the tube will also be retained in this chamber against passage into the system.

To facilitate the placing of the nipple unit 16, 17 against the nipple unit 7, 12, the cylindrical wall 23 is formed with a guiding flange 28 of flaring contour which will serve to deflect and guide the rounded or beaded periphery 29 of the bell 12 within the cylindrical portion 23, and immediately upon the valve 9 being unseated the pressure differential acting on the bell 17 will urge the marginal portion of the rubber disk 21 into resilient contact with the marginal portion 29 of the bell 12 to firmly seat and seal the contact against air leakage. The rubber disk will therefore have an air tight engagement with both bells and by reason of the pressure differential the cooperating parts will be firmly held in this air tight relation as long as the milking operation continues. Upon completion of the milking operation a quick whip or movement of the hose 4 laterally, such as to a position indicated by the broken lines 4' in Fig. 2, will break the air tight seal and tilt the bell 17 upon the fixed bell 12 whereupon the spring 10 will act against the suction line pressure to seat the valve 9 and thereby close the nipple 7 against free entrance of air into the system.

The milking installation is practical in that the mere placement of the bells one upon the other will automatically establish a communication between the milking machine and the low pressure of the system. The axial alignment of the two bells will be insured under the action of the pressure differential and will be automatically accomplished without effort on the part of the attendant. The unseating of the valve 9 will be effected by a cushioned action through the resilient suspension of the disk 24, and after the suction line communication has been established the rubber disk will assume a slightly dished contour by reason of the pull exerted by the hose 4 on the sealing contact with the rolled edge 29 of the bell 12. The resilient disk 21 may readily be replaced for renewing the filter sheet 20 and for cleaning the chamber 27 as occasionally required.

In place of the rubber or resilient support 21 a rigid member 24', Fig. 4, may be provided, this being shown as a U-shaped member spot welded to the bell 17', with an annular resilient member or disk 21' fitting in the seat 22.

The construction is simple and economical in production, and while the foregoing description has been given in detail it is not intended thereby to limit the invention since the inventive principles involved are capable of assuming other physical embodiments without departing from the spirit of the invention and the scope of the appended claims.

What is claimed is:

1. A stall cock coupling for milking machine installations, comprising a stall cock having a spring pressed shut-off valve normally closing the same, and a hose coupler cooperating with the stall cock to open the valve, the stall cock and the coupler each having a bell fitting at their marginal portions one within the other, one bell having an encircling wall for receiving the other bell, such circular wall being provided with a seat forming groove, and a resilient perforated disk expanded into the groove in interlocking engagement with the wall and having a central portion serving to open the valve upon bringing the bells together.

2. A stall cock coupling for milking machine installations, comprising a stall cock having a spring pressed shut-off valve normally closing the same, and a hose coupler cooperating with the stall cock to open the valve, the stall cock and the coupler each having a bell fitting at their marginal portions one within the other, one bell having an encircling wall for receiving the other bell, such circular wall being provided with a seat forming groove, and a resilient perforated disk expanded into the groove in interlocking engagement with the wall and having a central portion serving to open the valve upon bringing the bells together, the encircling wall having a flaring mouth to receive and direct the placement of the complemental bell upon the stall cock bell.

3. A stall cock coupling for milking machine installations, comprising a stall cock having a spring pressed shut-off valve normally closing the same, and a hose coupler cooperating with the stall cock to open the valve, the stall cock and the coupler each having a bell fitting at their marginal portions one within the other, one bell having an encircling wall for receiving the other bell, such circular wall being provided with a seat forming groove, and a resilient perforated disk expanded into the groove in interlocking engagement with the wall and having a central portion serving to open the valve upon bringing the bells together, the resilient disk forming a seat for the marginal portion of the stall cock bell and held in air tight relation therewith by the pressure differential acting on such parts.

4. A stall cock coupling for milking machine installations, comprising a stall cock having a spring pressed shut-off valve normally closing the same, and a hose coupler cooperating with the stall cock to open the valve, the stall cock and the coupler each having a bell fitting at their marginal portions one within the other, one bell having an encircling wall for receiving the other bell, such circular wall being provided with a seat forming groove, and a resilient perforated disk expanded into the groove in interlocking engagement with the wall and having a central portion serving to open the valve upon bringing the bells together, the marginal portion of the stall cock bell being rolled to seat upon the resilient disk in air tight relation and with sufficient clearance with respect to the encircling wall to enable tilting of the complemental bell upon the stall cock bell for breaking the air tight seal in effecting disconnection of the milking machine from the supply line.

5. A stall cock coupling for milking machine installations, comprising a stall cock opening through a bell, a valve normally closing the stall cock passage and having an actuating part extending into the bell, a hose coupler also having a bell cooperable with the stall cock bell for connecting a milking machine hose to a supply line, the coupler bell having an encircling bell receiving wall, the other bell fitted at its marginal portion within said wall, said coupler bell being provided with an annular seat forming groove, and a resilient perforated disk mounted within the bell groove and having a central portion in engagement with the valve part thereby serving to open the valve upon bringing the bells together, the coupler bell having an extension into its bell in coaxial opposition to the valve part to give support to the central portion of the resilient disk.

6. A stall cock coupling for milking machine installations, comprising a stall cock opening through a bell, a valve normally closing the stall cock passage and having an actuating part extending into the bell, a hose coupler also having a bell cooperable with the stall cock bell for connecting a milking machine hose to a supply line, the coupler bell having a marginal portion encircling the marginal portion of the other bell and provided with an internal annular seat, and a resilient disk engaged in the bell seat, the coupler having a part to open the valve upon bringing the bells together, the resilient disk being held against the marginal portion of the stall cock bell in air tight relation therewith by the pressure differential acting on the two bells, the marginal portion of the stall cock bell being rolled to seat upon the resilient disk in air tight relation and with sufficient clearance with respect to the encircling marginal portion of the hose coupler bell to enable tilting of the latter upon the rolled margin for breaking the air tight seal in effecting disconnection of the coupler from the stall cock.

7. A stall cock coupling for milking machine installations, comprising a stall cock member, a valve normally closing the member, a stall cock coupler member cooperable with the stall cock member for connecting a hose to a supply line, the stall cock and coupler members having bell portions one telescopically fitted one within the other, the valve having a stem engaged by a part on the companion member to open the valve when the members are assembled, said coupling member having an internal seat, a resilient perforated disk having its peripheral margin sprung into the seat for support and having a central imperforate part serving to open the valve upon bringing the bell portions together, said disk having a portion radially inwardly from the seat engaged margin on which the inner bell portion of the stall cock has sealing contact, and a flow pipe section extending into the coupler member to give support to the central part of the disk and having lateral means of communication with the interior of the companion member.

8. A stall cock coupling comprising a bell-like coupler member having a substantially axial support provided with a fluid flow passage opening thereinto, the inner side wall of the bell of the coupler having a circumferentially extending seat, a resilient perforated disk sprung into interlocking supporting engagement with the seat and having an imperforate central part engaged with and supported by said axial support, and a stall cock having a normally closed valve engaged by the supported central part of the disk for holding the valve opened.

9. A stall cock coupling for milking machine installations, comprising a stall cock opening through a bell, a valve normally closing the stall cock passage and having an actuating part extending into the bell, a hose coupler also having a bell cooperable with the stall cock bell for connecting a milking machine hose to a supply line, the coupler bell having a marginal portion encircling the marginal portion of the other bell and provided with an internal annular seat, and a resilient disk engaged in the bell seat and formed in its central portion with an opening therethrough, the coupler having a part acting through the disk opening upon the valve to open the same upon bringing the bells together, the resilient disk being held against the marginal portion of the stall cock bell in air tight relation therewith by the pressure differential acting on the two bells, the marginal portion of the stall cock bell being rolled to seat upon the resilient disk in air tight relation and with sufficient clearance with respect to the encircling marginal portion of the hose coupler bell to enable tilting of the latter upon the rolled margin for breaking the air tight seal in effecting disconnection of the coupler from the stall cock.

AUSTIN E. ANDERSON.

References Cited in the file of this patent

UNITED STATES PATENTS

| Number | Name | Date |
|---|---|---|
| 198,584 | Eames | Dec. 25, 1871 |
| 541,908 | Weaver | July 2, 1895 |
| 875,706 | Good | Jan. 7, 1908 |
| 1,137,551 | Taby et al. | Apr. 27, 1915 |
| 1,205,686 | Uhl | Nov. 21, 1916 |
| 1,362,522 | Biette | Dec. 14, 1920 |
| 1,497,283 | Petrequin | June 10, 1924 |
| 1,588,898 | Martocello | June 15, 1926 |
| 1,758,443 | Jansson | May 13, 1930 |
| 1,854,797 | Kirkpatrick | Apr. 19, 1932 |
| 2,136,803 | Newmark et al. | Nov. 15, 1938 |
| 2,251,071 | Scott | July 29, 1941 |
| 2,256,717 | Kors | Sept. 23, 1941 |
| 2,277,229 | Hulbert | Mar. 24, 1942 |
| 2,450,461 | Wallach | Oct. 5, 1948 |

FOREIGN PATENTS

| Number | Country | Date |
|---|---|---|
| 121,863 | Great Britain | Jan. 9, 1919 |